April 22, 1930. B. F. SEYMOUR 1,755,194
SHOCK ABSORBING DEVICE
Filed Jan. 13, 1928 2 Sheets-Sheet 2
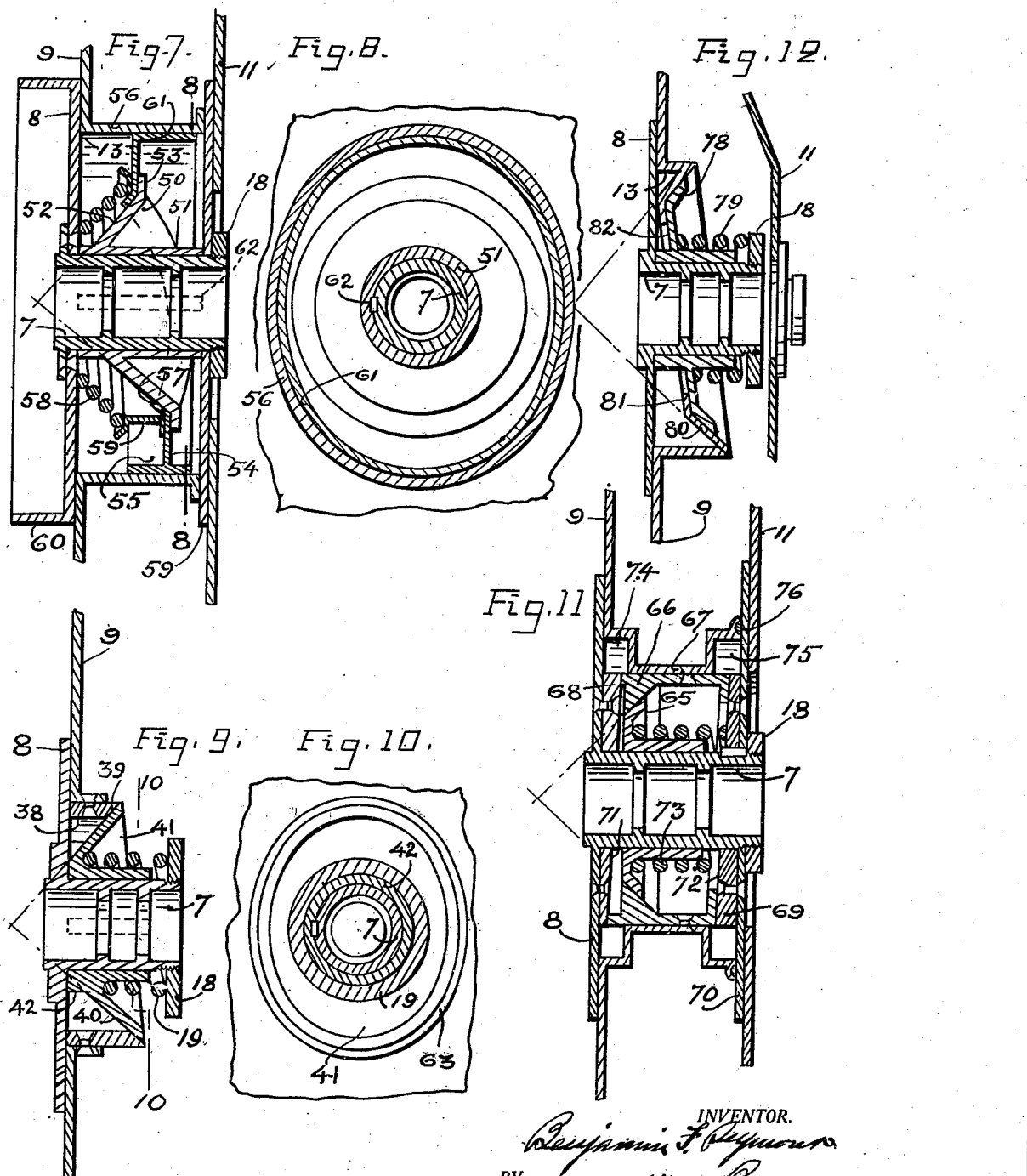

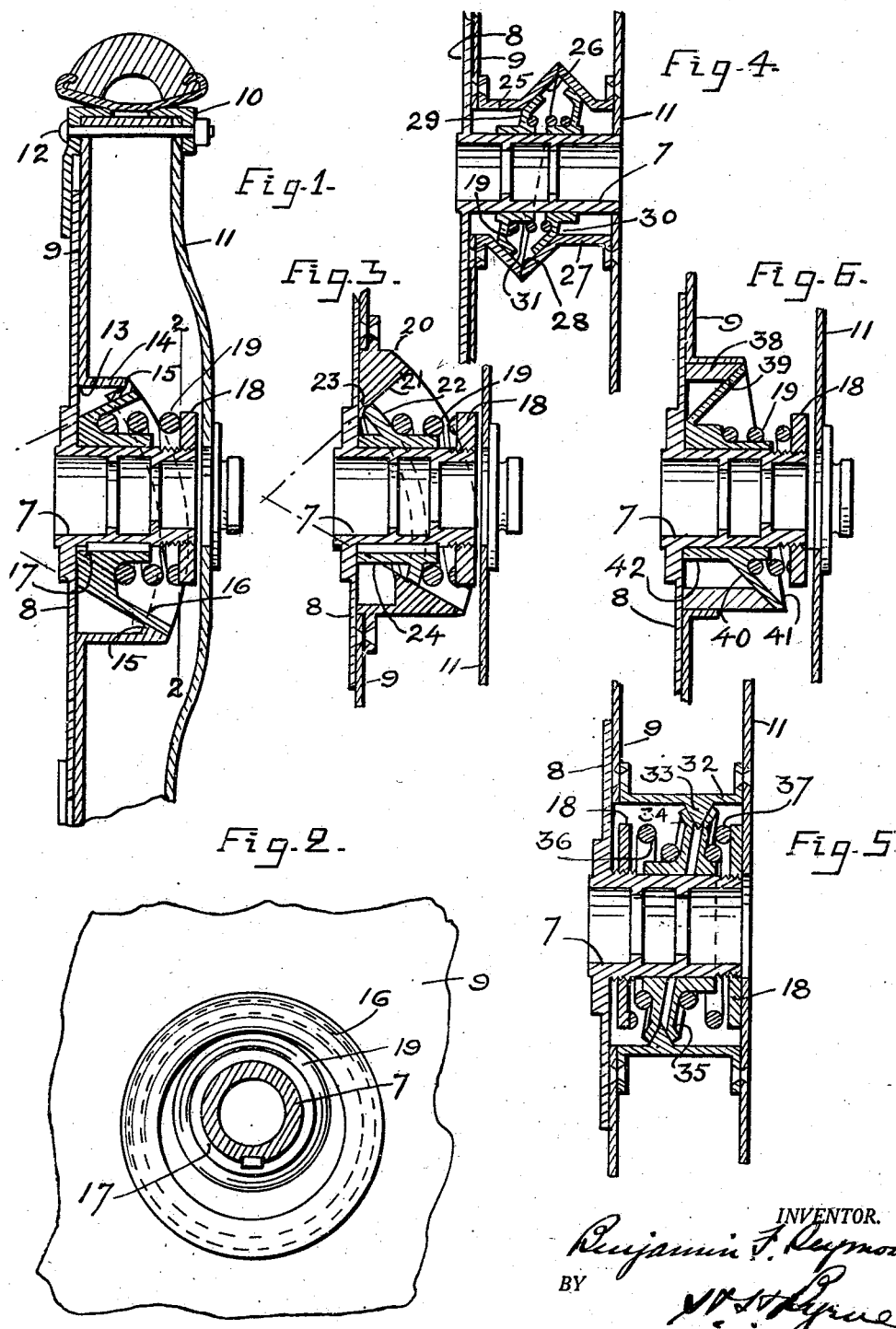

Patented Apr. 22, 1930

1,755,194

UNITED STATES PATENT OFFICE

BENJAMIN F. SEYMOUR, OF WASHINGTON, DISTRICT OF COLUMBIA

SHOCK-ABSORBING DEVICE

Application filed January 13, 1928. Serial No. 246,441.

The present invention relates to a shock absorbing device, resilient transmissions, bearings, or the like in general, and particularly to such devices as applied to vehicle wheels and consists in the combinations and arrangements of elements hereinafter described and particularly set forth in the accompanying claims.

The main purpose of the invention is to provide a flexible or resilient shock absorber and transmission between a driving and driven element adapted to positively and uniformly transmit the driving force from one to the other in whatever relative positions the said elements have at the moment; and such transmission being capable of readily accommodating itself to all working conditions to which the elements may be subjected.

A further purpose of the invention is to provide a combined resilient transmission and bearing for vehicle wheels to the end that such a wheel may possess the desired resilient qualities and also furnish the necessary transmission medium between the wheel proper and the motive power of the vehicle, while at the same time the device serves as a shock absorber.

The construction shown and described herein is a further improvement of the construction shown in my Patent No. 1,540,189, of June 2, 1925.

The construction here shown is characterized therein that the wheel rim is provided with a cone element which is not only eccentrically mounted thereon but also set at askew with relation to the axis of the wheel and this cone element cooperates with a corresponding conical sleeve which is mounted to slide axially on the wheel hub when the rim is subjected to the action of radial, or circumferential forces while a spring holds the parts in cooperative relation.

In some instances these conditions may be reversed and the axially sliding cone element mounted on the wheel rim or its equivalent, while the corresponding, fixed cone element is attached to the hub member of the wheel.

The invention is shown by way of illustration in the accompanying drawing, wherein:

Figure 1 is a fragmentary vertical, axial section taken through the wheel;

Figure 2 is a fragmentary front face view of Figure 1 with the cover plate and spring collar removed;

Figure 3 is a fragmentary sectional view similar to Figure 1 of a modified construction;

Figures 4 and 5 show other modified constructions with double acting cones in fragmentary sectional views;

Figure 6 is a fragmentary vertical axial section of a cone construction with obliquely positioned cone faces;

Figure 7 shows another modification of the invention in fragmentary vertical section with brake attachment and the sliding cone element on the wheel rim and elliptical contour;

Figure 8 is a fragmentary section along line 8—8 of Figure 7;

Figure 9 a fragmentary vertical section with obliquely mounted cone elements with elliptical face contour;

Figure 10 a fragmentary face view and section along line 10—10 of Figure 9;

Figure 11 a fragmentary vertical section showing a combination of cone elements and wedges; and, Figure 12 shows in fragmentary vertical section a construction similar to Figure 1 but with the female cone element provided with a reinforcing bottom flange.

Referring to the parts in further detail, the reference characters designating corresponding members in the several views, the construction as illustrated in Figures 1 and 2 represents the preferred form and in which reference numeral 7 designates the wheel hub with an inner flange or annular plate 8 adjacent the vehicle body and 9 designates the inner side plate of the wheel rim 10 and reference numeral 11 the outer side plate or cover, which plates are held together on the rim 10 by the usual bolts 12. These plates have central openings large enough to permit radial displacement of the rim with regard to the hub, and the rim plate 9 has radial sliding contact with the hub flange 8.

Around the central opening 13 is provided a collar 14 which is placed eccentric with regard to the axis of the wheel. The collar 14 terminates with a turned back conical flange or operating edge 15 which is set askew or whose axis is inclined with regard to the axis of the hub as clearly shown. A male cone element 16 engages with this operating edge and is also set askew on its sleeve 17 which surrounds the hub 7 and is nonrevoluble but slidably mounted thereon by means of a key or the like. The apex of the cone elements coincides, however, with the hub axis.

At the outer or free end of the hub 7 is provided an adjustable collar 18 threaded on the hub and between this collar and the male cone element 16 is inserted a compression spring 19, the resistance of which may be readily adjusted by means of the collar 18. The purpose of the spring is to hold the cone element 16 tightly pressed against the operating edge of the female cone element 15.

In this manner the wheel parts will be held together semi-rigidly and the device will act as a shock absorber if the wheel rim is subjected to sudden impact, when the operating edge or female cone element 15 will slide up on one side of the cone element 16 thereby compressing the spring 19 while the rim becomes momentarily eccentric on the hub. As soon as the blow has passed, the parts return to their normal positions.

Likewise, a radial shock on the wheel rim will displace the parts in the same manner until balance is restored, the shock in each case being gradually absorbed and changed to axially directed forces along the wheel axle.

As a resilient transmission the device will operate as follows: The torque of the hub will cause the male cone element 16 to rotate. The friction between the ground and the rim 10 will resist this rotation which compels the male cone element to turn with relation to the female cone edge 15 which in turn will cause the cone sleeve 17 to slide axially on the hub against the pressure of the spring 19. When the forces are balanced the rim will revolve with the hub. In this manner the vehicle will have a gradual and very easy start and an even running, as all fluctuations in the driving and resisting forces will be evened out by the resilient, eccentric or skew-set elements.

Referring now to the modified form of the invention shown in Figure 3, this is very similar in action to the just described construction with the exception that the cooperating cone elements have been reversed. In this case the rim plate 9 terminates at its central opening with an eccentric ring 20 having an inner cone shaped surface 21 with its apex on the hub axis but with its axis inclined against the hub axis. Cooperating with this eccentric ring is shown a cam disk 22, the peripheral edge 23 of which engages the cone shaped surface 21. This disk is integral with or firmly secured to a sleeve 24 mounted to slide but not rotate on the hub 7. A compression spring 19 is also here inserted between the cam disk 22 and the adjusting collar 18.

In Figure 4 the resilient transmission and shock absorber is shown double-acting, that is to say, that cone elements are provided at both ends of the hub 7. The ring 25 at the central opening of the rim plate 9 is here shown with an internal cone surface 26 eccentric as well as inclined to the wheel axis. Likewise the outer rim plate 11 is provided with a ring 27 having a similar cone shaped internal surface 28. Two opposing disks 29 and 30 inclined in the same manner as the cone surfaces and adapted to contact therewith are slidably but non-revolubly mounted on the hub 7 with a spring 19 between them to spread them apart, and they are guided on the hub by their sleeves 31. The operation of this modified form will be easily understood from the foregoing.

In Figure 5 the ring 32 secured on the rim plates 9 and 11 is provided with an annular cam element 33 also inclined against the axis of the wheel hub. A pair of opposing disks 34, 35 are slidably but non-revolubly mounted on the hub 7, while two springs 36, 37, tend to press the disks against the annular cam element 33.

The main difference between the construction shown in Figure 6 over that shown in Figure 1 is that the female cone face is formed on an attached ring but the operation is identical. The central eccentric ring 38 is secured to the rim plate 9, but it is made thick enough to provide a wide bevelled edge 39 which is adapted to engage the straight cone surface 40 of the eccentrically mounted male cone element 41 which, with its sleeve 42, is slidable but non-revoluble on the hub 7.

In all the above constructions the slidable cone element has been mounted on the wheel hub. In Figures 7 and 8, on the other hand, the male cone element 50 is here shown with its sleeve 51 fixedly mounted by means of a key 62 on the wheel hub 7. Its cone surface 52 has its apex on the axis of the hub but it is otherwise obliquely situated thereto. To provide a good wearing surface the cone terminates with a flange 53 which normally rests on the flat surface 54 of the female cone element 55 which is slidably mounted in axial direction in the tubular portion 56 at the inner opening 13 of the rim plate 9. The inner flange 57 of the female cone element 55 conforms to the cone surface 52 of the male cone element 50. A spring 58 contacts at one end with the hub flange 8 and at the other end with a spring seat or adapter 59 which engages with the back face of the female cone element 55. In this manner the operating surfaces of both cone elements are held in constant contact.

The sundry parts are assembled and held together on the hub 7 between the inner and outer hub flanges 8 and 59 by means of the collar 18 threaded on the hub, and the flanges have radial slidable contact with inner and outer rim plates 9 and 11. This construction is furnished with a brake drum 60 which preferably forms a unit with the hub flange or plate 8 as indicated.

The tubular rim portion 56 and its counterpart the tubular flange 61 of the female cone element 55 are both elliptical as best seen in Figure 8, for the purpose of intensifying positiveness of drive. When the device is exposed to shocks the female cone element 55 will slide axially in the tubular rim portion 56 while its conical flange 57 is displaced along the conical surface 52 of the male cone element 50 and against the action of the spring 58. The latter will subsequently restore the parts into normal position directly the shocks have subsided.

In Figures 9 and 10 is shown a construction very similar to that illustrated in Figure 6 and the same description applies to both in general. The difference between them resides in the fact that the cone elements in Figure 6 are circular while the cones in the latter are elliptical. This is best seen in Figure 10 where the cone elements show an elliptical contour at 63 where they engage.

In Figure 11 is shown a double acting construction of cone elements and wedge plates. The male cone element 65 is mounted non-revolubly but axially slidable on the hub 7 and the female cone element 66 is here permanently secured on the inside of the cylindrical drum 67 which forms a unit with the rim plate 9.

At each end of the hub is provided a wedge plate 68 and 69, respectively, which are secured to the end flanges 8 and 70 non-rotatably as indicated. The inner opposing surfaces 71 and 72 are set obliquely or at an inclination to the axis of the hub and the corresponding flat end surfaces of the female cone element 66 has the same inclination against the hub axis.

Between the wedge plate 69 and the male cone element 65 is inserted a compression spring 73 which tends to keep the cone surfaces and the flat surfaces respectively of the cones and the wedges in constant contact. The threaded collar 18 as before keeps the parts assembled on the hub.

In order to permit radial displacement of hub and rim member, annular recesses 74 and 75 are formed on the rim plate 9 at the ends of the cylindrical drum 67, or in other words, the drum is considerably narrower than the distance between the inclined surfaces of the wedge plates 68 and 69. At the outer end of the drum 67 is provided an annular packing 76 in a suitable groove for the purpose of furnishing easy sliding contact with the outer hub flange 70 as illustrated.

The parts have the relative position illustrated in this figure during normal running. When a shock is applied against the wheel, it will be evident that the wedges 68 and 69 sliding along the inclined flat surfaces will enter the pockets 74 and 75. This will cause the relative displacement of the cone elements 65 and 66 and the compression of the spring 73. Subsequently the spring restores the parts into normal position.

Lastly referring to the modification of the invention as illustrated in Figure 12, this shows a construction very similar to that seen in Figure 1 and has a solid disk for its male cone element 78 which, as before, is set obliquely to the axis of the wheel hub 7 but with the cone apex coinciding therewith. It is mounted to slide axially without revolving on the hub 7 and is held in yielding position thereon by the compression spring 79 backed up by the threaded collar 18.

Around the central opening 13 of the rim plate 9, which has slidable engagement with the hub flange 8, the female cone element 80 is secured or built as a unit with the rim plate and has the same conicity as the male cone element 78 with which it engages. The female cone element terminates with an annular flange 81, which contacts with the flat bottom surface 82 of the male cone element 78. This annular flange 81 is provided for the purpose of increasing the strength of the cone element and also to give additional driving contact and wearing qualities of the parts. The operation of this modified construction is similar to that described in connection with Figure 1.

It is to be understood that the invention is not limited to the details of construction here shown and disclosed, but that these may be varied widely without departing from the spirit of the invention as defined by the claims.

What I claim as new is:

1. In a shock absorber and resilient bearing, the combination with cooperating male and female members adapted to have limited radial movement between them; of a fixed, eccentric cone element on one of said members, a corresponding cone element slidably mounted in axial direction on the other of said members, and resilient means holding said cone elements in contact with each other, the axes of the cooperating faces of said cone elements being set obliquely to the axis of said members.

2. In a vehicle wheel, the combination with a hub member and a wheel member adapted to have limited radial movement between them; of a fixed eccentric cone element on one of said members, a corresponding cone element slidably mounted in axial direction of the other of said members, and resilient means holding said cone elements in contact with each other, the axes of the cooperating faces of said cone elements being set obliquely to the axis of the wheel.

3. In a resilient transmission and bearing construction, a series of cooperatively engaged elements comprising a concentric element, an eccentric element in contact therewith, said elements having the axes of their contacting faces set obliquely to the transmission axis, a hub element, housing elements and resilient means, said housing elements and resilient means being adapted to hold the others of said elements in cooperative relation.

4. In a resilient transmission and bearing, the combination with driving and driven annuli, of contacting eccentric and concentric elements associated therewith having the axes of their contacting faces set obliquely to the axis of the annuli, one of said elements mounted axially slidable on one of said annuli, and resilient means adapted to hold said annuli and said elements in cooperative relation.

5. In a transmission, the combination with revoluble members; of driving and driven elements having contacting faces, the axes of which are obliquely arranged with relation to the axis of revolution of said members and resilient means adapted to hold said elements in cooperative relation.

In witness whereof, I have hereunto set my hand at Denver, Colorado, this 5th day of December, A. D. nineteen hundred and twenty-seven.

BENJAMIN F. SEYMOUR.